Oct. 28, 1969   E. L. MANGAN   3,474,668
NONCONTACTING GAUGES FOR AUTOMATICALLY MEASURING
THE PROFILE OF MOVING STRIP
Filed Oct. 12, 1967   2 Sheets-Sheet 1
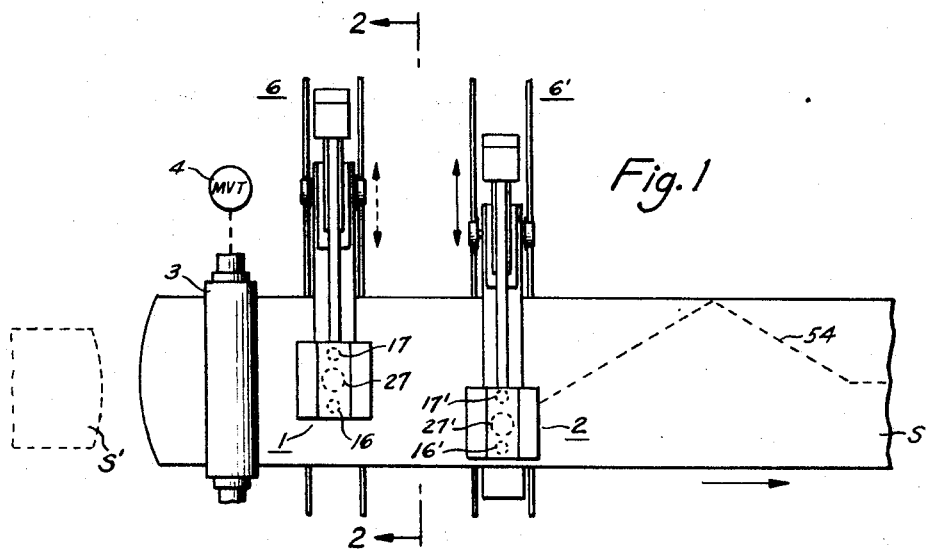
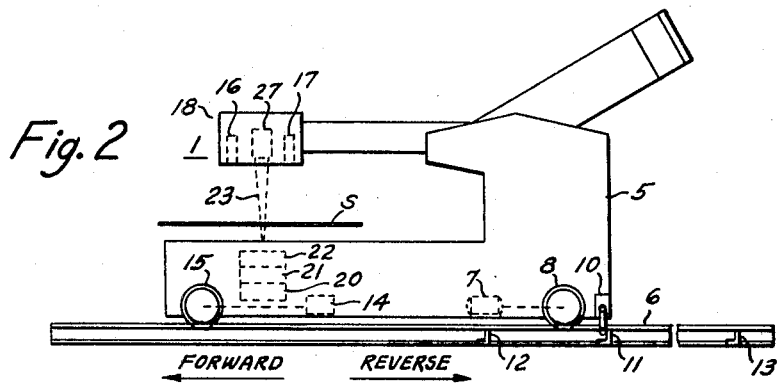
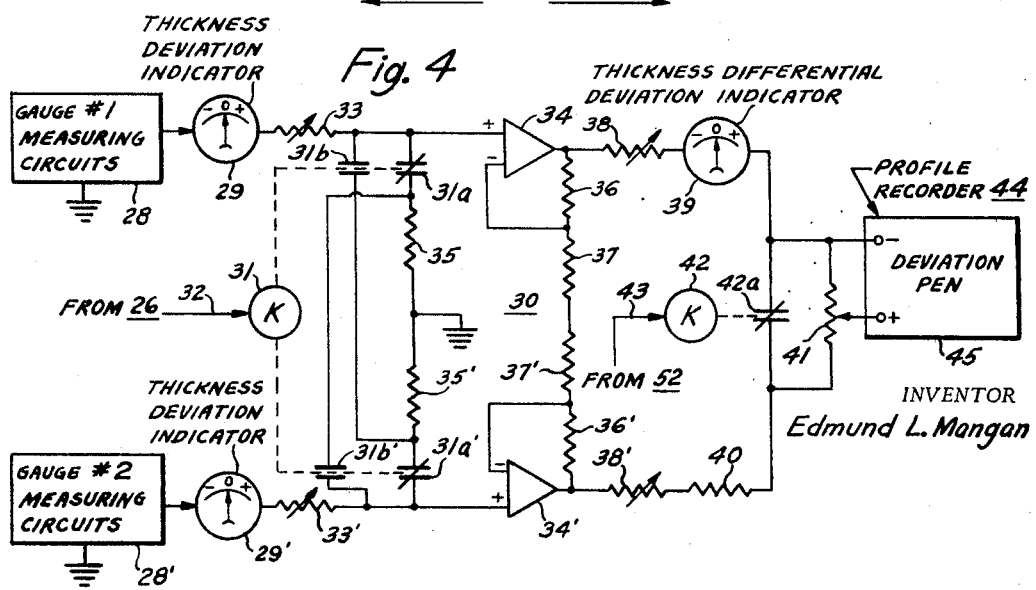
INVENTOR
Edmund L. Mangan

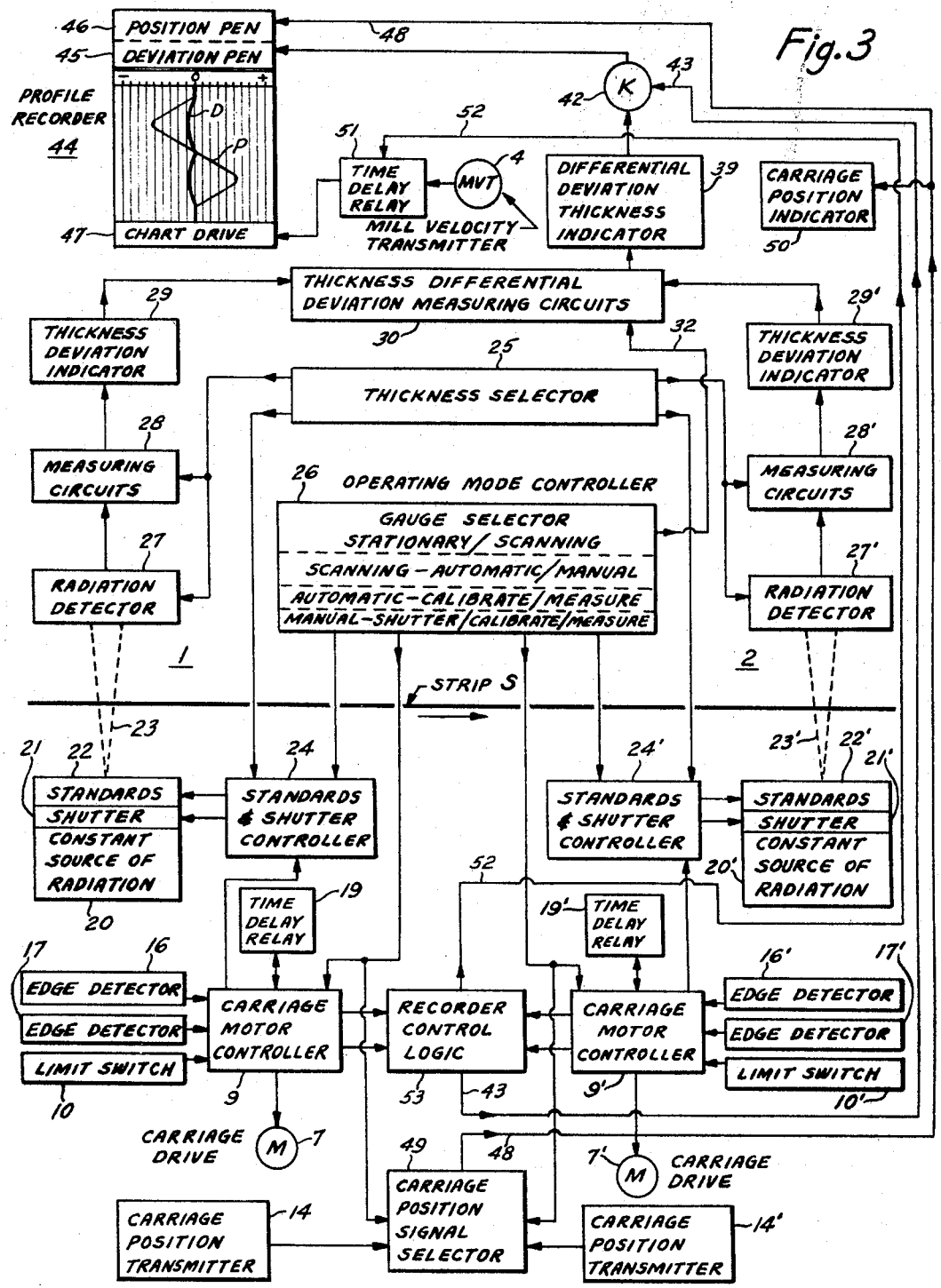

United States Patent Office 3,474,668
Patented Oct. 28, 1969

3,474,668
NONCONTACTING GAUGES FOR AUTOMATICALLY MEASURING THE PROFILE OF MOVING STRIP
Edmund L. Mangan, Bethlehem, Pa., assignor to Bethlehem Steel Corporation, a corporation of Delaware
Filed Oct. 12, 1967, Ser. No. 674,906
Int. Cl. G01l 5/10
U.S. Cl. 73—159                               2 Claims

ABSTRACT OF THE DISCLOSURE

Thickness variations and lateral profile of longitudinally moving strip of various widths are measured by two movable radiation thickness gauges. Either gauge may be selected as a scanning gauge and driven laterally across the strip by driving means while the other gauge is selected as a stationary gauge and positioned at one of several lateral locations. Infrared strip edge detecting means is located in each gauge head, although only the one in the scanning gauge operates on the driving means to automatically reverse said gauge each time a lateral edge of the moving strip is detected, regardless of how wide or narrow the strip is, or where the strip is located within the limits of the widest strip. Comparing means, produces a signal of the algebraic difference in gauge outputs which, together with a scanning gauge position signal, are fed to a profile recorder that produces a composite record of the two variables relative to strip length and proportional to mill velocity.

---

This invention relates to noncontacting apparatus for automatically measuring thickness variations and lateral profie of longitudinally moving strip of various widths.

In the high speed production of hot rolled steel strip, for example, it is well known that a heated steel slab is moved at accelerated speeds through a series of stands having sets of work rolls to effect a reduction in slab thickness to a desired strip thickness. Each set of work rolls is spaced equilateral of, and sequentially along, a longitudinal rolling mill centerline, or simply a mill centerline. A mill operator causes the longitudinal center of the heated slab to be introduced to the work rolls at a longitudinal pass line, or simply a pass line. Ordinarily, the mill operator locates the pass line coincidental with the mill centerline, but on occasions he may locate it on one side or another. In practice, a variably located pass line has been referred to a random pass line. Furthermore, in such high speed installations, maladjustments in roll set spacing produces a substantial amount of off-gauge strip which at times varies in thickness both longitudinally and laterally. In addition, rolls wear unevenly along some surfaces more than others and produce a crown or contour across the moving strip as well as localized defects in the surface of the strip being rolled. It is therefore important that the mill operator be accurately and rapidly informed of such deficiencies so that corrective action may be taken to restore mill balance in as short a time as possible. Where roll wear is a problem, the mill operator may choose to roll a narrow strip on a pass line other than the mill centerline, thereby extending the useful life of the rolls.

Heretofore, both fixed and scanning noncontacting gauges have been employed to make thickness deviation measurements at selected positions across the width of the moving strip. These have not proved entirely satisfactory because of their inaccuracies, slow response time, inflexibility, and other reasons.

SUMMARY OF THE INVENTION

It is therefore an object of this invention to provide apparatus for automatically measuring thickness variations of various width strips moving longitudinally along a mill centerline.

Another object of this invention is to provide apparatus for automatically measuring the lateral profile vs. length of various width strips moving longitudinally along a mill centerline.

Still another object of this invention is to provide apparatus for automatically measuring the lateral dimension of various width strips moving longitudinally relative a random pass line referenced to a mill centerline.

In the present invention the foregoing objects are carried out by a first and second accurate and movable thickness gauge, either of which may be scanned laterally across the width of the moving strip while the other remains stationary. Strip detectors located on the scanning gauge operate on scanning drive means to cause reversal of said means each time an edge of the moving strip is detected regardless of how wide the strip is or where the strip pass line is in relation to mill centerline. A comparing means output signal of the algebraic difference of gauge outputs, together with a scanning gauge position signal, are fed to a two-pen profile recorder whose chart is driven by a mill velocity transmitter. This arrangement has the advantages of providing an indication and permanent record of strip thickness variations, lateral profile in combination with scanning gauge position signal to relate where across the width and along the length of the strip deviations exist, and what width of material was rolled along a random pass line in relation to roll defects.

BRIEF DESCRIPTION OF THE DRAWINGS

FIG. 1 is a plan view showing schematically the apparatus of the present invention;

FIG. 2 is an elevational view taken along line 2—2 of FIGURE 1;

FIG. 3 is a block diagram of the measuring and control apparatus;

FIG. 4 is a schematic diagram of the means for comparing the outputs of both gauges.

DESCRIPTION OF THE PREFERRED EMBODIMENTS

Referring now to the drawings, thickness gauges 1 and 2 are installed adjacent each other on the discharge side of work roll 3 in the last stand of hot strip rolling mill for measuring thickness deviations of strip S as it moves longitudinally through the gauges. The velocity of strip S is signalled by mil velocity transmitter 4 which is coupled to work roll 3.

Because of mill operating preferences, both thickness gauges are alike, hence similar parts making up gauge 2 are indicated by priming the corresponding parts of gauge 1. Each gauge is capable of either remaining stationary or being moved laterally across the width of strip S and is mounted on carriage 5 which is adapted for movement on track 6. Carriage 5 is driven at a speed of about six inches per second by brake motor 7 which is mechanically coupled to rear wheels 8 and electrically connected to carriage motor controller 9. Limit switch 10 is circuited to controller 9 and is operative under control of tripper 11 so as to signal when the gauge is at mill centerline and trippers 12 and 13 to signal when the gauge has reached extreme forward and reverse positions, respectively. Carriage position transmitter 14 is coupled to front wheels 15 and produces a zero voltage when the carriage is on the mill centerline and a negative or positive voltage proportional to forward or reverse movement from the mill centerline, respectively. Forward and reverse infrared edge detectors 16 and 17, respectively, are located in gauge head 18 and are circuited to carriage motor controller 9 to effect energization and reversal of brake motor 7 as will be explained later. Time delay relay 19 produces a recorder control signal momentarily after controller 9 becomes energized which also will be explained later.

In a preferred embodiment, thickness gauges 1 and 2 consist of a highly accurate and responsive apparatus such as is described in my copending application Ser. No. 674,905, entitled "Multirange Radiation Thickness Gauge," filed concurrently herewith. Briefly, the gauges 1 and 2 diagrammed in FIG. 3 comprise a constant source of radiation 20, such as X-rays, a shutter 21, a plurality of digital calibrating and complimenting thickness standards in magazine 22 through which a beam of penetrative radiation 23 is directed toward one side of strip S. Thickness standards selection and shutter operation are under control of controller 24 which receives coded signals of desired thickness from thickness selector 25 and also receives programming signals from operating mode controller 26 yet to be described. Selector 25 and controller 26 supply their respective signals to both gauge 1 and gauge 2. The intensity of penetrated radiation from beam 23 is picked up by radiation detector 27 and fed to measuring circuits 28 wherein it is compared to an electrical standard. Both detector 27 and measuring circuits 28 operate under control of range selection signals fed from thickness selector 25. The output signals from measuring circuits 28 and 28' are proportional to thickness deviation in thousandths of an inch from the thickness setting on selector 25. These are fed through zero-center thickness deviation indicators 29 and 29', respectively, into thickness differential deviation measuring circuits 30.

In the thickness differential deviation measuring circuits 30 shown in FIG. 4, gauge 1 is considered to be stationary and gauge 2 scanning with reference to gauge 1. In this state, polarity changing relay 31 is deenergized for the lack of a signal on circuit 32. The output of gauge 1 is fed through adjustable gain resistor 33, to a low impedance amplifier 34 and relay contact 31a and then through load resistor 35 to ground. When, for example, a ±0.020" thickness deviation is introduced by calibration standards 22, gain resistor 33 is adjusted so that indicator 29 reads that amount. A voltage across load resistor 35 corresponding to the thickness deviation is fed to amplifier 34. In a like manner, the output of gauge 2 is fed through adjustable gain resistor 33', to a low impedance amplifier 34' and relay contact 31a', then through load resistor 35' which is equal to 35, and then to ground. Gain resistor 33' is adjusted during the same calibrated deviation as used for gauge 1 so that indicator 29' reads the same amount.

Amplifiers 34 and 34' operate in a balanced feedback and stabilizing network through resistors 36, 37 and 36', 37', respectively. Amplifier 34 and 34' outputs also feed a current comparison circuit involving adjustable gain resistors 38, 38', zero-center ±0.020" thickness differential deviation indicator 39, load resistor 40, and output potentiometer 41 for determining the algebraic difference of their outputs. When recorder control relay 42 is energized by a signal on circuit 43, thus opening contacts 42a, gain resistor 38 is adjusted so that thickness differential deviation indicator 39 reads +0.020" when the corresponding signal is fed from amplifier 34. In a like manner, gain resistor 38' is adjusted so that indicator 39 reads −0.020" when the corresponding signal is fed from amplifier 34'. The energization of circuit 43 will be explained later.

In order to maintain indicator 39 frame of reference when gauge 2 is stationary and gauge 1 is scanning, operating mode controller 26 energizes polarity changing relay 31 over circuit 32, thereby opening contacts 31a, 31a', and closing contacts 31b, 31b'. Gauge 1 output is now applied across load resistor 35' instead of 35 and gauge 2 output is applied to load resistor 35 instead of 35'. In this manner, the algebraic difference in current always flows in the same direction in the comparison circuit regardless of which gauge is stationary or scanning, thus maintaining the same polarity of thickness differential deviation at indicator 39 and output potentiometer 41.

Referring now to FIG. 3, thickness differential deviation signals from measuring circuits 30 are fed to a center-zero, two-pen, strip chart profile recorder 44 at deviation pen 45 input. Recorder 44 also includes a carriage position pen 46 input and a variable speed chart drive 47. Pen 46 input is fed over circuit 48 from carriage position signal selector 49 which also drives carriage position indicator 50. Selector 49 receives signals from carriage position transmitters 14 and 14'; and is operative under control of controller 26. Chart drive 47 is powered from mill velocity transmitter 4 through time delay relay 51 having a timed opening function under control of circuit 52. When carriage motor controller 9 or 9' is energized, control signals are fed to recorder control logic 53 which immediately energizes circuit 52 to allow chart drive 47 to operate when either carriage drive motor operates. Controller 9 or 9' also feeds signals through time delay relay 19 or 19' to recorder control logic 53 which transmits a control signal on circuit 52 momentarily after carriage drive motors 7 or 7' are energized.

Still referring to FIG. 3, operation of gauges 1 and 2 is under control of operating mode controller 26 which includes switching and circuit means for programming carriage motor controllers 9, 9', standards and shutter controllers 24, 24', thickness differential deviation measuring circuits 30, carriage position signal selector 49, and recorder control logic 53 through controllers 9, 9'.

Operating mode controller 26 programming includes gauge 1 and 2 selection for stationary or scanning modes, and scanning in automatic and manual modes. The automatic calibrate and measure, and the manual shutter, calibrate and measure modes of operation illustrate the wide choice of operating modes characterizing each of the particular thickness measuring apparatus employed in the preferred embodiment. Inasmuch as each of these modes of operation are described in detail in the aforesaid copending application, it is deemed unnecessary to repeat them herein. However, in the present invention, the automatic mode of operation will be assumed wherein calibrating standards are simultaneously removed from the radiation beam 23, 23' and complimenting or measuring standards introduced in their place. This occurs responsive to a strip detector which senses the presence and absence of strip S in the gauge. In the present invention this signal is fed to each controller 24, 24' responsive to either of the edge detectors 16 or 17 and 16' or 17' after acting on time delay relays 19, 19', respectively.

When gauge 1 is selected as the stationary gauge and gauge 2 as the scanning gauge, and scanning operation is automatic, then operating mode controller 26 disables carriage drive motor 7 when carriage 5 is assumed to be on mill centerline. It also enables motor 7' to drive carriage 5' continuously from an assumed starting position at mill centerline along a scanning path shown by the dotted line 54 in FIG. 1. Carriage 5' proceeds to make a complete scanning cycle which is interrupted by limit switch 10' acting on controller 9' upon returning to the mill centerline.

Operating mode controller 26 also enables standards and shutter controllers 24, 24' to operate on shutters 21, 21' and standards 22, 22' to operate in response to a preselected thickness of say 0.080" by thickness selector 25. In addition, controller 26 acts on carriage position signal selector 49 to connect transmitter 14' by way of circuit 48 to position pen 46 in profile recorder 44.

Under these conditions, when strip S enters gauge 1 either strip detector 16 or 17 acts through carriage motor controller 9, on recorder control logic 53, over circuit 52 to time delay relay 51 to energize chart drive 47 and start chart movement. At the same time recorder control logic 53 disables relay 42 to short circuit the input of deviation pen 45 and maintain its trace D at center zero. Since the scanning operation has not started, position pen 46 trace P also is maintained at center zero.

When strip S enters gauge 2 either strip detector 16' or 17' acts on carriage motor controller 9' and relay 19' so that after a momentary delay to insure gauge settlement, drive motor 7' starts the scanning cycle. By this time both gauges are in normal operation and their outputs fed into thickness differential deviation measuring circuits 30 where relay 42 is energized by circuit 43 to remove the short circuit on deviation pen 45 the instant drive motor 7' becomes energized. Both pens on the profile recorder 44 are now in normal operation and the strip chart is being driven.

Regardless of how wide strip S may be, or where its pass line may be with respect to the mill centerline, gauge 2 scans in the reverse direction until edge detector 17' senses the upper edge of strip S as shown in FIG. 1. It then signals controller 9' to reverse motor 7' and scan strip S in the opposite direction until strip detector 16' senses the lower edge of strip S as shown in FIG. 1. At this instant controller 9' reverses motor 7' and scanning continues until limit switch 10' disables controller 9' when carriage 5' arrives back at the mill centerline. Carriage 5' remains there until the next strip (S') enters the gauge.

During scanning, traces D and P were being recorded on profile recorder 44 while their numerical values were also observable on differential deviation indicator 39 and carriage position indicator 50. At the end of the scanning cycle, relay 42 is disabled, thus restoring the short circuit on the input to deviation pen 45 and maintaining a center zero position. Simultaneously circuit 52 is de-energized but relay 51 holds in and allows chart drive 47 to run momentarily after gauge 2 scaning terminates.

This produces a lateral profile recording of strip S which indicates, when reading in FIG. 3 from bottom to top, that trace D was produced when the output of gauge 2 was less than gauge 1 while at different longitudinal positions than gauge 1. This negative value indicates that strip S had a crown. If the output of gauge 2 were greater than gauge 1, trace D woud have been of opposite polarity, thus indicating that strip S was dished. If the output of gauge 2 was less than gauge 1 while at different longitudinal positions than gauge 1 during the first half of the scanning cycle and greater than gauge 1 during the last half of the scanning cycle, trace D would indicate that strip S profile was wedge shaped.

Trace P was produced by automatically scanning strip S whose width is determined by the number of scale graduations between the right and left hand peaks and whose pass line was on the mill centerline as determined by the equality of scale graduations between peaks and center zero. If strip S' were passed through gauges 1 and 2, the edge detectors would automatically cause the lateral scanning path to narrow and shift to the left. Thus, the simultaneous recording of traces D and P provides valuable strip profile information not only to the rolling mill operator but to subsequent processors and users.

When gauge 2 is selected as the stationary gauge and gauge 1 as the scanning gauge, the overall operation is the same except that reference numerals identified with the scanning operation should be interchanged. In addition operating mode controller 26 signals relay 31 over circuit 32 to change the polarity of the thickness differential deviation measuring circuits to maintain the same frame of reference for indicator 39 and trace D in profile recorder 44.

When operating in the manual scanning mode, either of the gauges may be moved to any lateral position across the rolling mill and maintained stationary or scanned, the latter being limited to action of trippers 12 and 13 which cause carriage reversal independent of strip detector action.

I claim:
1. Apparatus for automatically measuring thickness variations of longitudinally moving strip of various widths, comprising:
   (a) first and second movable thickness gauges each including a gauge head for measuring strip thickness along longitudinal planes of said strip,
   (b) reversible driving means for independently moving the thickness gauges laterally across the width of the widest strip, either of said gauges being selected as a scanning gauge and the other as a stationary gauge positioned at one of a plurality of predetermined locations;
   (c) radiation-sensitive strip edge detecting means located in said gauge heads and operative on the driving means for automatically reversing the scanning gauge when detecting a lateral edge of said various width strips, said reversal occurring at any lateral edge location at and within the limits of the widest strip; and
   (d) means for comparing the outputs of said gauges at various lateral positions of the scanning gauge.

2. Apparatus for automatically measuring the profile of longitudinally moving strip of various widths, comprising:
   (a) first and second movable thickness gauges each including a gauge head for measuring strip thickness along longitudinal planes of said strip;
   (b) reversible driving means for independently moving the thickness gauges laterally across the width of the widest strip, either of said gauges being selected as a scanning gauge and the other as a stationary gauge positioned at one of a plurality of predetermined locations;
   (c) radiation-sensitive strip edge detecting means located in said gauge heads and operative on the driving means for automatically reversing the scanning gauge when detecting a lateral edge of said various width strips said reversal occurring at any lateral edge location at and within the limits of the widest strip;
   (d) means for signalling the lateral position of said scanning gauge while moving over the various width strips at various lateral locations; and
   (e) means for simultaneously comparing two continuous parameters, one a strip profile as represented by the algebraic difference between thickness gauge outputs, and the other a scanning gauge position as signalled by means (d), said comparison occurring continuously along a predetermined length of said moving strip and preferably proportional to strip velocity.

References Cited

UNITED STATES PATENTS

| | | |
|---|---|---|
| 2,834,247 | 5/1958 | Pickels. |
| 3,108,844 | 10/1963 | Alexander et al. __ 346—49 XR |
| 3,179,800 | 4/1965 | McNamara _____ 250—52 |
| 3,244,881 | 4/1966 | Hansen et al. ____ 250—52 XR |

FOREIGN PATENTS 683,000   3/1964   Canada.

LOUIS R. PRINCE, Primary Examiner

JEFFREY NOLTON, Assistant Examiner

U.S. Cl. X.R.

250—52; 346—49